(12) United States Patent
Marceau et al.

(10) Patent No.: US 9,244,922 B2
(45) Date of Patent: *Jan. 26, 2016

(54) DATA MANAGEMENT SYSTEM

(71) Applicant: Rave Wireless, Inc., Framingham, MA (US)

(72) Inventors: Brett Wilfred Marceau, Clinton, MA (US); Matthew A. Serra, Morristown, NJ (US)

(73) Assignee: Rave Wireless, Inc., Framingham, MA (US)

( * ) Notice: Subject to any disclaimer, the term of this patent is extended or adjusted under 35 U.S.C. 154(b) by 26 days.

This patent is subject to a terminal disclaimer.

(21) Appl. No.: 14/254,266

(22) Filed: Apr. 16, 2014

(65) Prior Publication Data

US 2014/0324770 A1 Oct. 30, 2014

Related U.S. Application Data

(63) Continuation of application No. 13/293,713, filed on Nov. 10, 2011, now Pat. No. 8,825,687.

(60) Provisional application No. 61/412,149, filed on Nov. 10, 2010.

(51) Int. Cl.
*G06F 17/30* (2006.01)

(52) U.S. Cl.
CPC .... *G06F 17/30017* (2013.01); *G06F 17/30345* (2013.01); *G06F 17/30368* (2013.01)

(58) Field of Classification Search
CPC .............. G06F 17/30017; G06F 17/30368; G06F 17/30345
USPC ............... 707/758, 805; 709/206, 217, 219; 455/3.04, 407, 425; 379/26.01, 399.01; 370/420, 421, 485
See application file for complete search history.

(56) References Cited

U.S. PATENT DOCUMENTS

| 7,509,304 | B1 * | 3/2009 | Pather et al. | |
| 2004/0002958 | A1 * | 1/2004 | Seshadri et al. | 707/3 |
| 2004/0002972 | A1 * | 1/2004 | Pather et al. | 707/6 |
| 2004/0002988 | A1 * | 1/2004 | Seshadri et al. | 707/102 |
| 2004/0068481 | A1 * | 4/2004 | Seshadri et al. | 707/1 |
| 2007/0156656 | A1 * | 7/2007 | Pather et al. | 707/3 |

OTHER PUBLICATIONS

Thompson, Exploiting telecommunications to deliver real time transport information, Apr. 21-23, 1998, IET, 59-63.*
Kyunghee Ji et al., Event Notification System for Multi-platform, 2005, IEEE, 6 pages.
Yucel et al., Event Aggregation and Distribution in Web-based Management Systems, 1999, IEEE 35-48.

* cited by examiner

Primary Examiner — Jean B Fleurantin
(74) Attorney, Agent, or Firm — Occhiuti & Rohlicek LLP

(57) ABSTRACT

In a general aspect, a computer-implemented method includes receiving, via an input interface of a notification platform, updated subscriber data; comparing, using a comparison module of the notification platform, the updated subscriber data with existing subscriber data stored in a subscriber database; and, based on the results of the comparing, modifying, using a modification module of the notification platform, the existing subscriber data stored in the subscriber database.

21 Claims, 2 Drawing Sheets

DATA MANAGEMENT SYSTEM

CROSS-REFERENCE TO RELATED APPLICATIONS

This application in a continuation of U.S. patent application Ser. No. 13/293,713, filed Nov. 10, 2011, which claims priority to U.S. Provisional Application Ser. No. 61/412,149, filed Nov. 10, 2010, the contents of which are incorporated herein by reference.

BACKGROUND

This application relates to a data management system.

Reliable and rapid delivery of large numbers of text messages is important to enterprises, public safety agencies, universities, and others with a need to quickly notify interested parties.

Multi-modal broadcast alert platforms (also known as notification platforms) are widely used to provide alert notifications to members of a community. For instance, federal, state, and local entities; businesses; and educational institutions (collectively referred to herein as institutions) make use of notification platforms to send messages efficiently to members of their respective communities.

Notification platforms administer the distribution of short message service (SMS) messages or other electronic communications to subscribers to the notification platform. A notification platform is administered by a messaging administrator. To send a message to subscribers, the messaging administrator generates a notification event within the notification platform. The notification event contains the text of the message that is to be sent to the subscribers. When a notification event is generated, the notification platform sends a message to each subscriber.

In general, a notification platform relies on the members of the institution employing the platform to enroll in the platform in order to receive notification messages relevant to the institution. The enrollment process typically calls upon a member to complete several, if not all, of the following steps:
1. Visit a website associated with the institution
2. Provide credentials or other personally identifying information to prove that the member is authorized to receive the institution's notifications
3. Provide one or more contact points (e.g., a mobile telephone number, a landline telephone number, an email address, an instant messenger handle, or another contact point) at which the member wishes to receive notification messages
4. Acknowledge the terms of use of the notification platform
5. Complete a confirmation process to confirm that the member owns or controls the designated contact point(s)

SUMMARY

In a general aspect, a computer-implemented method includes receiving, via an input interface of a notification platform, updated subscriber data; comparing, using a comparison module of the notification platform, the updated subscriber data with existing subscriber data stored in a subscriber database; and, based on the results of the comparing, modifying, using a modification module of the notification platform, the existing subscriber data stored in the subscriber database.

Embodiments may include one or more of the following.

The method further includes verifying, using a verification module, an integrity of the updated subscriber data. An integrity of the updated subscriber data includes an integrity of a file containing the updated subscriber data.

The method further includes validating, using a validation module, a quality of the updated subscriber data. The method further includes generating, using a report module, a report indicative of the results of the validating.

The method further includes generating, using a report module, a report indicative of the results of the modifying of the existing subscriber data. The report has a format that corresponds to a format of a file containing the updated subscriber data. The method further includes providing the report to an administrator of the notification platform. The report is indicative of an error in the modifying.

The updated subscriber data includes at least one of a subscriber identifier and a subscriber contact point.

The subscriber database is located on the notification platform.

The method further includes sending, using a messaging module of the notification platform, a message to a mobile communications device associated with each subscriber included in the modified subscriber database.

In another general aspect, a system includes an input interface configured to receive updated subscriber data; a comparison module configured to compare the updated subscriber data with existing subscriber data stored in a subscriber database; and a modification module configured to, based on the results of the comparing, modify the existing subscriber data stored in the subscriber database.

Embodiments may include one or more of the following.

The system further includes a verification module configured to verify an integrity of the updated subscriber data.

The system further includes a validation module configured to validate a quality of the updated subscriber data. The system further includes a report module configured to generate a report indicative of the results of the validating.

The system further includes a report module configured to generate a report indicative of the results of the modifying of the existing subscriber data.

The subscriber database, the comparison module, and the modification module are co-located on a notification platform.

The system further includes a messaging module configured to send a message to a mobile communications device associated with each subscriber included in the modified subscriber database The systems and methods disclosed herein offer a number of advantages.

The data management subsystem and associated methods can make use of contact information that has already been collected by an institution for its members, thus eliminating a redundant step of collecting contact information for the explicit purpose of the notification platform. A notification platform making use of this data management subsystem thus may achieve a high subscription rate among members of its associated institution, thus helping to ensure that the vast majority of the members of the institution will receive messages generated by a notification event. In particular, because members of the institution do not need to actively complete an enrollment process, it is not necessary to make them aware of the enrollment process. Furthermore, no time or effort is required from members of the institution to enroll in the notification platform, and thus members are less likely to be discouraged from enrolling.

The contact information can be loaded into the notification platform directly. The robustness of the data management subsystem helps to ensure that the resulting database is high quality, error free, and stable.

Data discrepancies that may arise when managing subscriber data across multiple systems and interfaces is avoided. This in turn reduces mistakes, such as the sending of messages to the wrong recipients or wrong contact points or missing entire segments of an institute's population.

The data management subsystem described herein involves minimal manual manipulation of the data. Thus, staff at the corresponding institution are freed from the need to manage member information, including parsing and exporting data from various systems in order to meet data management criteria of a particular notification platform. Furthermore, the staff does not need to determine which information in a subscriber database needs to be added, removed, or modified within the database to ensure that the database reflects the current communications preferences of the institution and its members. Rather, such determinations are made by the data management subsystem.

The reduction of manual and institution-level data manipulation allows the institution's staff to interact with the data only at a high level. More detailed data manipulation and system integration work, such as processes that involve a deep understanding of the challenges of multi-modal messaging and strategies to mitigate such challenges, are undertaken by the data management subsystem itself. This automation can help reduce errors and frees up resources for the institution.

Other features and advantages of the invention are apparent from the following description and from the claims.

DETAILED DESCRIPTION

Figure 1:
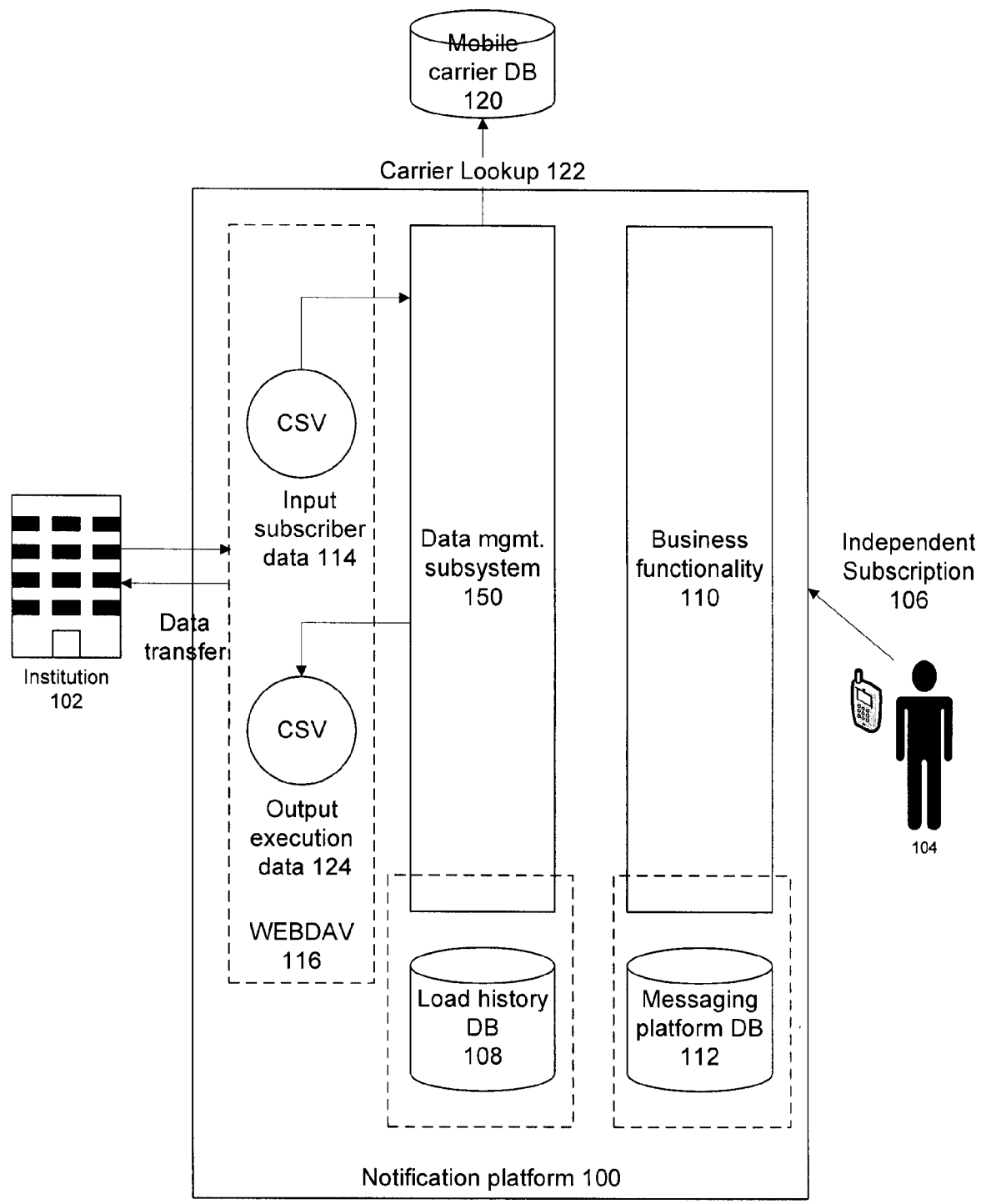
FIG. 1 is a block diagram of a notification platform.

Referring to FIG. 1, a notification platform 100 associated with an institution 102 administers the distribution of short message service (SMS) messages or other electronic communications, such as emails or voice messages, to subscribers 104 of the notification platform. Subscribers 104 receive notification messages from the notification platform. For instance, university students subscribed to their university's safety alert notification platform receive messages relevant to public safety at their university. Residents of a city and/or commuters to that city may choose to subscribe to a local traffic alert group to receive traffic status messages.

In some cases, enrollment in notification platform 100 is initiated by subscriber via an independent subscription process 106. In other cases, a subscription to the notification platform associated with a particular institution 102 is automatic and/or mandatory for members or affiliates of the institution. For example, any university student who provides a mobile or landline telephone number or email address to the university may be automatically enrolled into the public safety notification platform for the university without any action on the part of the student. Subscriber information, such as the subscriber's mobile and/or landline telephone number(s), mobile carrier(s), email address(es), and preferred mobile communication device or method, is stored in a subscriber database 108 on notification platform 100.

Notification platform 100 is administered by a messaging administrator at the corresponding institution 102. To send an SMS message to subscribers, the messaging administrator generates a Notification Event within notification platform 100. The Notification Event contains the text of the message (e.g., "Exit 20 of Interstate 90 is closed. Seek alternate route."). The Notification Event may also include other information, such as a percentage of messages that are to be successfully delivered in order for the Notification Event to be closed. When a Notification Event is generated, the notification platform sends a notification message to each subscriber according to the subscriber information stored in subscriber database 108. The messaging functionality of the notification platform 100 is managed by a business functionality platform 110 and data relevant to the messaging functionality is stored in a messaging database 112.

A data management subsystem 150 manages subscriptions that are administered by the institution 102 associated with the notification platform 100. In general, data management subsystem 150 receives subscriber data from the institution and verifies the integrity and validity of the data. Data management subsystem also processes the data such that correct, updated data for each subscriber is ultimately stored in subscriber database 108. Data management subsystem 150 also provides a data reporting functionality which returns reports to institution 102 at the conclusion of the processing of data provided by the institution. These functionalities are described in greater detail below.

Data Receipt and Integrity Check

Figure 2:
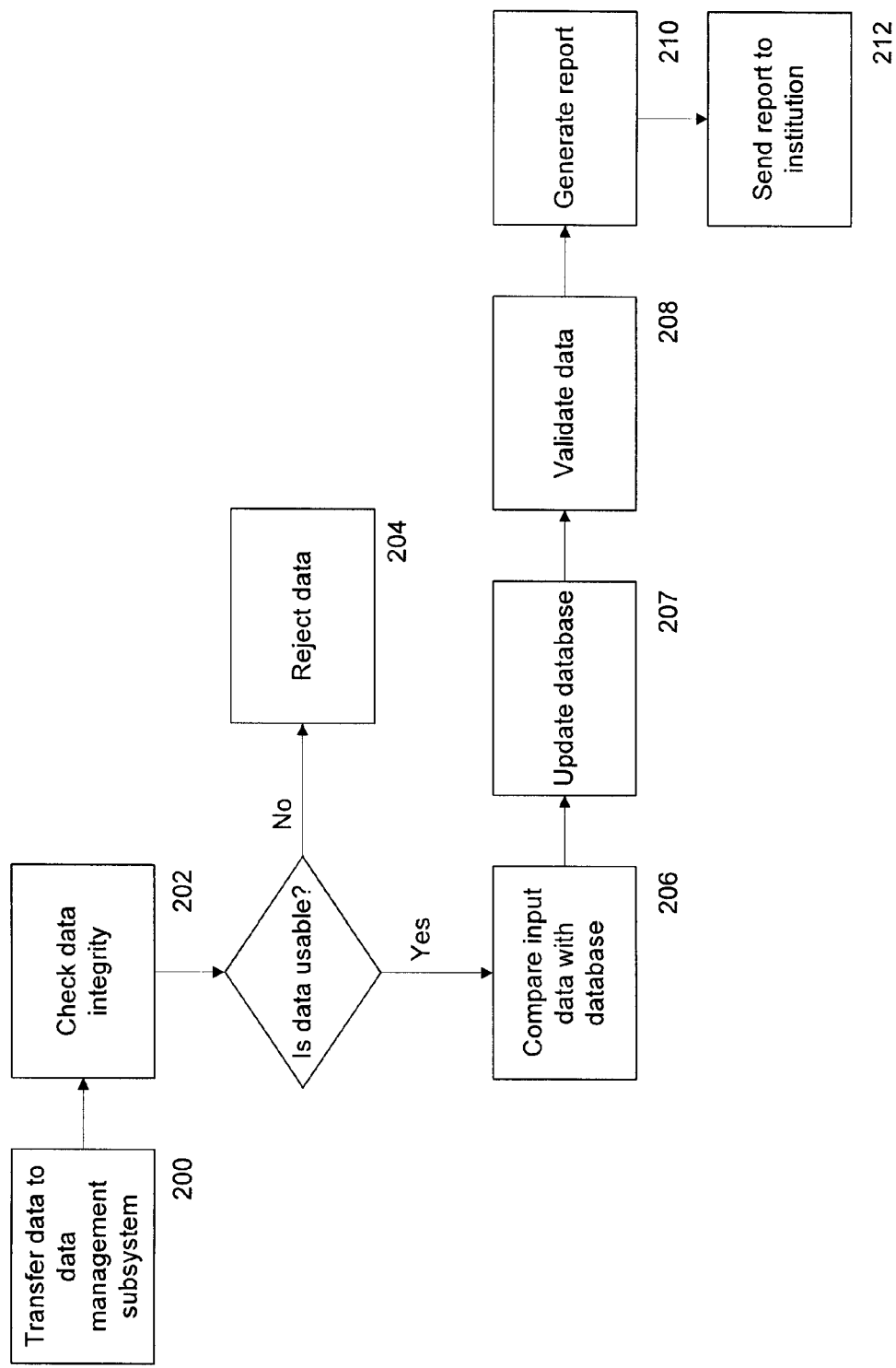
FIG. 2 is a flowchart of the operation of a data management subsystem.

Referring to FIGS. 1 and 2, the institution 102 associated with notification platform 100 submits subscriber data, such as identification and contact information, to data management subsystem 150. Data is transferred from the institution to the data management subsystem (step 200) via a data interface, either via a direct connection (as shown) or via the Internet. In particular, an input file 114 is stored by the institution 102 on a shared access directory 116, such as a WEBDAV (Web-based Distributed Authoring and Versioning) system, hosted by notification platform 100. Alternatively, data may be provided via other electronic means. For instance, subscriber data may be formatted as an XML document and transferred to the notification platform as a web-service request.

In an exemplary embodiment; the messaging administrator of institution 102 creates a comma separated value (CSV) spreadsheet containing subscriber data, such as subscriber identification and contact information and contact preferences. Data management subsystem 150 may request that the CSV file be provided in a pre-defined format to facilitate data processing. Subscriber identification information may include data such as, e.g., first name, last name, or a user identifier. Contact information for a subscriber may include data such as, e.g., mobile telephone number(s), landline telephone number(s), email addresses, instant messenger handles, or other common contact points. In addition, subscriber preferences regarding use of the various contact points may be included (e.g., a subscriber may note that all communication should be via SMS message to the provided mobile telephone number rather than via email or voice message).

Upon receipt of the input file 114, data management subsystem 150 checks the integrity of the data to ensure that it can be read and processed (step 202). If the data is unusable for any reason (e.g., the file is corrupted or the file is incorrectly formatted), the input file 114 is rejected in its entirety, in order to avoid improper manipulation of the data (step 204).

Data Differential Processing

Data management subsystem 150 may impose criteria on the format and content of the input data file 114 in order to simplify generation of the load file that is used to update subscriber database 108. In particular, the data management subsystem may request that the data included in input file 114 describe the desired end state of the subscriber database 108 rather than changes to be made to the subscriber database.

That is, the input data preferentially includes a list of all subscribers and associated contact points and alerting preferences, rather than a list of changes to be made to preexisting data stored on the notification platform.

Once in receipt of the input file 114, the data management subsystem 150 compares the contents of the input file with the contents of subscriber database 108 (step 206) to identify what information is to be added to, removed from, or modified within the database. Based on the comparison, the subscriber database is updated according to the contents of the input file (step 207).

This differential approach relieves the messaging administrator from performing these complex comparative calculations before providing the input data to the notification platform. In addition, the differential approach eliminates the possibility for the institution's subscriber database to become out of sync from the notification platform's subscriber database 108.

In some embodiments, individual subscribers are given the ability to update their own information via a subscriber interface. The data management subsystem 150 will defer to additions and changes made by subscribers over data provided by the institution 102, under the assumption that the data provided by the subscriber is more likely to be correct than data provided by an intermediary (the institution).

Data Validation

The data management subsystem 150 applies lower-level data validation steps (step 208) to maximize the likelihood that a notification message will be successfully delivered to a subscriber's contact point. These checks include, for instance:

Evaluating email addresses to confirm that they conform to email address format criteria Confirming that email domains (i.e., emailhandle@emaildomain) are properly formatted, exist as routable domains, and do not contain common typographical errors Referring to third-party managed databases (e.g., a mobile carrier database 120) via a carrier lookup function 122 to identify the mobile carrier supporting a particular mobile telephone number, and adding and/or updating mobile carrier information in subscriber database 108. Implementing these validation checks within the data management subsystem rather than at the institution level allows for the leveraging of domain-specific knowledge embedded into the notification platform without the need for such knowledge to be developed in house at the institution. Furthermore, centralization of data management and validation avoids the possibility of contending approaches to the management of messaging data compromising the success of a notification event.

Reporting

As the data contained in input file 114 is processed, data management subsystem 150 generates a report 124 that identifies the actions taken while processing the record for each subscriber (step 210). The report identifies the record processed and the outcome of processing the record. For instance, the report may state that a mobile telephone number previously stored in subscriber database 108 for a particular subscriber was deleted and replaced with a newly provided mobile telephone number. The report may also indicate that the carrier lookup function on the new mobile telephone number revealed that a different mobile carrier supports the new number, and that an appropriate update was made to the mobile carrier entry for that subscriber.

Once all the data contained in input file 114 is processed, the completed report is returned to the messaging administrator at the institution (step 212). For instance, the report may be stored on the WEBDAV system 116. Alternatively, the report may be sent (e.g., emailed) to the messaging administrator. The messaging administrator at the institution reviews the report, notes any processing errors or warnings indicated on the report, and takes appropriate action to resolve the errors. For instance, the messaging administrator may contact a subscriber to resolve a user-generated error indicated on the report.

The format of the report 124 matches the format of input file 114. Thus, the messaging administrator can resolve errors directly within the report and resubmit the updated file to the data management subsystem 150 for reprocessing, thereby simplifying data clean-up activities.

Implementation

The notification platform runs on a computing platform, such as, for instance, a multi-threaded computing environment interfaced with external messaging delivery channels and mobile carrier databases via the Internet.

The notification platform can be applied to any messaging technology, including, for instance, SMPP (Short Message Peer-to-Peer protocol) via SMS aggregators, SMPP direct to carriers, SMTP (Simple Mail Transfer Protocol) direct to carriers, SIP (Session Initiation Protocol), SOAP/XML (Simple Object Access Protocol/Extensible Markup Language), or CAP (Common Alerting Protocol).

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the techniques described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element, for example, by clicking a button on such a pointing device). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact over a communication network. The relationship of client and server arises by virtue of computer programs running on the respective computers and having a client-server relationship to each other.

It is to be understood that the foregoing description is intended to illustrate and not to limit the scope of the invention, which is defined by the scope of the appended claims. Other embodiments are within the scope of the following claims.

What is claimed is:

1. A computer-implemented method for modifying subscriber data, said method comprising the steps of receiving updated subscriber data, comparing said updated subscriber data with existing subscriber data, and modifying said existing subscriber data, wherein the step of receiving said updated subscriber data comprises receiving said updated subscriber data via an input interface of a notification platform, wherein the step of comparing said updated subscriber data with existing subscriber data comprises using a comparison module to compare said updated subscriber data with said existing subscriber data, wherein said existing subscriber data is stored in a subscriber database, wherein said comparison module is a constituent comparison module of said notification platform having said input interface, wherein the step of modifying said existing subscriber data that is stored in said subscriber database comprises using a modification module of said notification platform, and wherein said modification of said existing subscriber data is carried out based at least in part on results of comparing said updated subscriber data with said existing subscriber data.

2. The computer-implemented method of claim 1, further comprising verifying, using a verification module, integrity of said updated subscriber data.

3. The computer-implemented method of claim 2, wherein integrity of the updated subscriber data includes integrity of a file that contains said updated subscriber data.

4. The computer-implemented method of claim 1, further comprising using a validation module to validate a quality of said updated subscriber data.

5. The computer-implemented method of claim 4, further comprising using a report module to generate a report indicative of results of validating a quality of said updated subscriber data.

6. The computer-implemented method of claim 1, further comprising using a report module to generate a report indicative of results of modifying said existing subscriber data.

7. The computer-implemented method of claim 6, further comprising providing said report indicative of results of modifying said existing subscriber data to an administrator of said notification platform.

8. The computer-implemented method of claim 6, wherein said report indicative of results of modifying said existing subscriber data comprises information indicative of an error in modification of said existing subscriber data.

9. The computer-implemented method of claim 1, wherein said updated subscriber data comprises information selected from the group consisting of a subscriber identifier, and a subscriber contact point.

10. The computer-implemented method of claim 1, wherein said subscriber database is located on said notification platform.

11. The computer-implemented method of claim 1, further comprising using a messaging module of said notification platform to send a message to a mobile communications device associated with each subscriber included in said modified subscriber database.

12. An apparatus for modifying subscriber data, said apparatus comprising computer hardware, said computer hardware comprising a processor that is programmed and configured to implement an input interface, a comparison module, and a modification module, wherein said input interface is configured to receive updated subscriber data, wherein said comparison module is configured to compare said updated subscriber data with existing subscriber data that is stored in a subscriber database, wherein said modification module is configured to modify said existing subscriber data stored in said subscriber database based at least in part on results, provided by said comparison module, of comparing said updated subscriber data with existing subscriber data stored that is stored in a subscriber database, and wherein said processor is further programmed and configured to implement a report module configured to generate a report indicative of results of validating quality of said updated subscriber data.

13. The apparatus of claim 12, wherein said processor is further programmed and configures to implement a verification module configured to verify integrity of said updated subscriber data.

14. The apparatus of claim 12, wherein said processor is further programmed and configured to implement a validation module configured to validate quality of said updated subscriber data.

15. The apparatus of claim 12, wherein said processor is further programmed and configured to implement a notification platform, wherein said subscriber database, said comparison module, and said modification module are co-located on said notification platform.

16. The apparatus of claim 12, wherein said processor is further programmed and configured to implement a messaging module, wherein said messaging module is configured to send a message to a mobile communications device associated with each subscriber included in said modified subscriber database.

17. An apparatus for modifying subscriber data, said apparatus comprising computer hardware, said computer hardware comprising a processor that is programmed and configured to implement an input interface, a comparison module, and a modification module, wherein said input interface is configured to receive updated subscriber data, wherein said comparison module is configured to compare said updated subscriber data with existing subscriber data that is stored in a subscriber database, wherein said modification module is configured to modify said existing subscriber data stored in said subscriber database based at least in part on results, provided by said comparison module, of comparing said updated subscriber data with existing subscriber data stored that is stored in said subscriber database, and wherein said processor is further programmed and configured to implement a report module configured to generate a report indicative of results of modifying said existing subscriber data.

18. The apparatus of claim 17, wherein said processor is further configured to implement a verification module configured to verify integrity of said updated subscriber data.

19. The apparatus of claim 17, wherein said processor is further configured to implement a validation module configured to validate quality of said updated subscriber data.

20. The apparatus of claim 17, wherein said processor is further configured to implement a notification platform, wherein said subscriber database, said comparison module, and said modification module are co-located on said notification platform.

21. The apparatus of claim 17, wherein said processor is further configured to implement a messaging module, wherein said messaging module is configured to send a message to a mobile communications device associated with each subscriber included in said modified subscriber database.

\* \* \* \* \*